(12) United States Patent
Calderon et al.

(10) Patent No.: US 9,430,763 B2
(45) Date of Patent: Aug. 30, 2016

(54) WEARABLE PAYMENT PROCESSING DEVICE

(71) Applicants: Ferdinand Uy Calderon, Cebu (PH); Jason Delos Angeles, Cebu (PH); Rodolfo Nacu, Jr., Cebu (PH)

(72) Inventors: Ferdinand Uy Calderon, Cebu (PH); Jason Delos Angeles, Cebu (PH); Rodolfo Nacu, Jr., Cebu (PH)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 14/264,895

(22) Filed: Apr. 29, 2014

(65) Prior Publication Data

US 2015/0310412 A1    Oct. 29, 2015

(51) Int. Cl.

| | |
|---|---|
| *G06Q 20/20* | (2012.01) |
| *G06K 7/00* | (2006.01) |
| *G06K 7/01* | (2006.01) |
| *G07G 1/00* | (2006.01) |
| *G07G 1/14* | (2006.01) |
| *G07F 7/08* | (2006.01) |

(52) U.S. Cl.
CPC ........... *G06Q 20/204* (2013.01); *G06K 7/0004* (2013.01); *G06K 7/01* (2013.01); *G06Q 20/202* (2013.01); *G06Q 20/206* (2013.01); *G06Q 20/208* (2013.01); *G07F 7/0886* (2013.01); *G07G 1/0081* (2013.01); *G07G 1/14* (2013.01)

(58) Field of Classification Search
CPC ..................................................... G06Q 20/204
USPC ..................................................... 235/462.44
See application file for complete search history.

(56) References Cited

U.S. PATENT DOCUMENTS

| | | | |
|---|---|---|---|
| 2003/0209604 A1* | 11/2003 | Harrison, Jr. ............ | 235/462.44 |
| 2011/0279385 A1* | 11/2011 | Chang et al. ................. | 345/173 |
| 2013/0254117 A1* | 9/2013 | von Mueller et al. .......... | 705/71 |
| 2014/0244514 A1* | 8/2014 | Rodriguez et al. ............. | 705/71 |
| 2014/0249944 A1* | 9/2014 | Hicks et al. .................... | 705/17 |

* cited by examiner

*Primary Examiner* — Toan Ly
(74) *Attorney, Agent, or Firm* — Schwegman, Lundberg & Woessner (57) ABSTRACT

Various embodiments each include at least one of devices, systems, methods, and software of or including a wearable payment processing device. A wearable payment processing device is a wearable device that allows for conducting point-of-sale transactions. One embodiment includes a mounting base having opposing sides. A first opposing side is adapted to attach to a fixed base and a second opposing side is adapted to attach to a payment processing device. The payment processing device includes a payment card reader, an imaging device, and a display device electrically interconnected by a mainboard. The mainboard of such includes at least one processor, at least one memory device, and a network interface device. The at least one memory device stores instructions executable by the at least one processor to perform product purchase transactions for products identified via the imaging device and with payment data received via the payment card reader.

17 Claims, 5 Drawing Sheets

WEARABLE PAYMENT PROCESSING DEVICE

BACKGROUND INFORMATION

Retail outlets typically transact product sales at checkout counters where cash registers and point-of-sale terminals are centrally located. More recent advancements have added self-service checkout terminals, but these terminals are still generally located in a central location within a retail outlet. Additionally, mobile devices have been augmented with apps and additional hardware proving abilities to receive payments, but such mobile device usage has thus far had limited acceptance in retail environments and the transient nature of the devices make them difficult to track and theft targets.

SUMMARY

Various embodiments each include at least one of devices, systems, methods, and software of or including a wearable payment processing device. A wearable payment processing device is a wearable device that allows for conducting point-of-sale transactions. One embodiment includes a mounting base having opposing sides. A first opposing side is adapted to attach to a fixed base and a second opposing side is adapted to attach to a payment processing device. The payment processing device includes a payment card reader, an imaging device, and a display device electrically interconnected by a mainboard. The mainboard of such includes at least one processor, at least one memory device, and a network interface device. The at least one memory device stores instructions executable by the at least one processor to perform product purchase transactions for products identified via the imaging device and with payment data received via the payment card reader.

DETAILED DESCRIPTION

Various embodiments each include at least one of devices, systems, methods, and software of or including a wearable payment processing device. A wearable payment processing device is a device wearable by company personnel, such as retail clerks, that allows for conducting point-of-sale transactions. A wearable payment processing device typically includes an imaging device to scan product bar codes, a display device to present a listing of products for which bar codes have been scanned and total currency amount of a transaction and a payment input device such as a bank card reader (e.g., a magnetic stripe reader, radio frequency identification tag reader, etc.). The display device may include touch input functionality to provide additional capabilities, such as for capturing of a customer signature, to receive input such as a personal identification number (PIN), other cardholder payment security data, transaction related input (i.e., initiate a product return transaction, put credit on a prepaid card, etc.), and to receive input with regard to how a receipt is to be provided (i.e., print a receipt, email or text a receipt, or no receipt). These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software, or a combination of software and hardware in one embodiment. The software comprises computer executable instructions stored on non-transitory computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a device, system such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
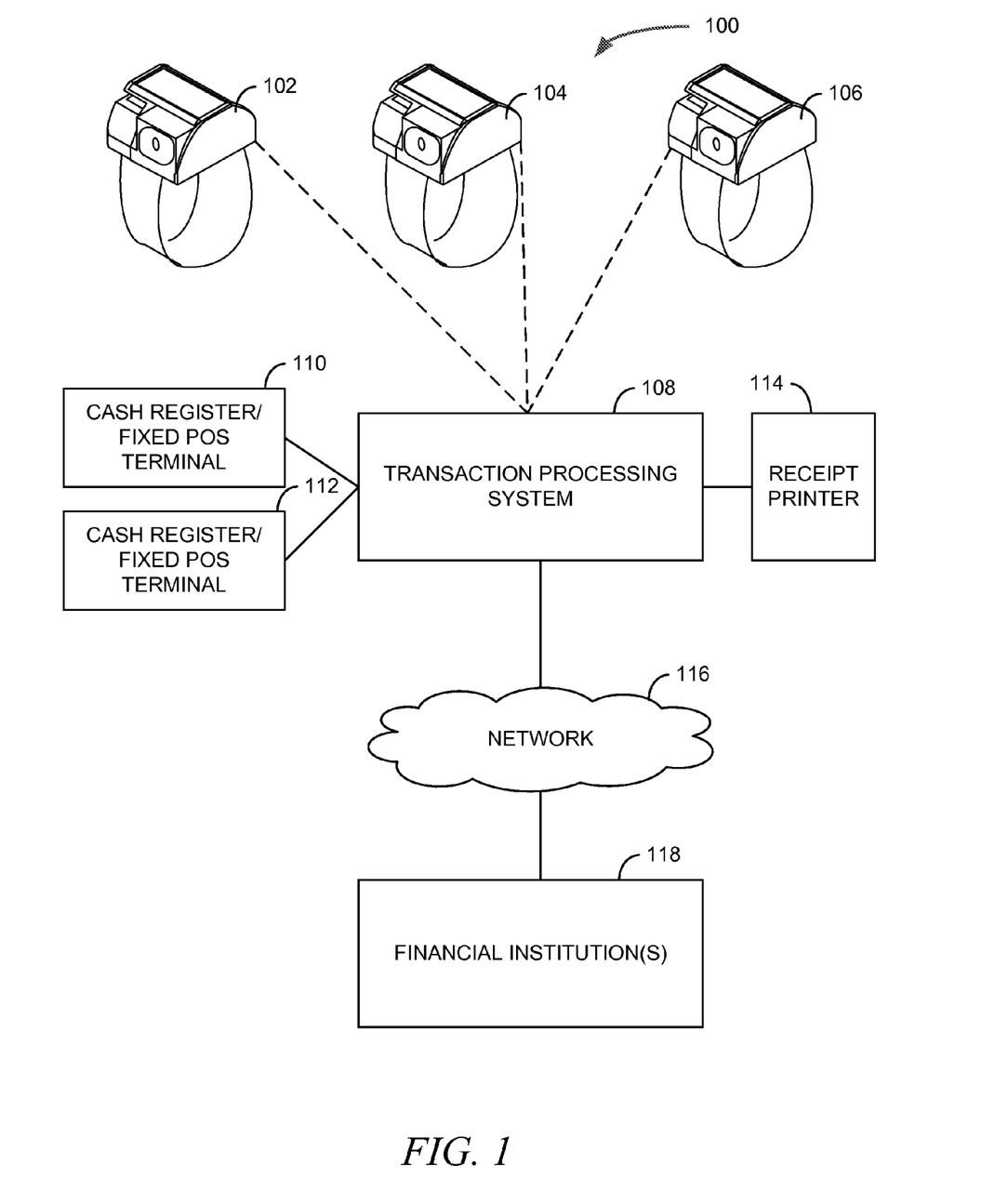
FIG. 1 is a logical block diagram of a system architecture, according to an example embodiment.

FIG. 1 is a logical block diagram of a system 100 architecture, according to an example embodiment. The system 100 is an example of a computing environment within which one or more wearable payment processing devices 102, 104, 106 may be utilized.

The system 100 includes one or more wearable payment processing devices 102, 104, 106 that communicate wirelessly with a transaction processing system 108 to process payment transactions, and other transaction types in some embodiments. The wearable payment processing devices 102, 104, 106 may wirelessly exchange transaction data with the transaction processing system via a Wi-Fi® network, Bluetooth® connectivity, or other wireless data communication protocols and device types. In some embodiments, the wearable payment processing devices 102, 104, 106 may exchange data with the transaction processing system 108 via a wireless connection to a computing device of a cash register or fixed location point-of-sale (POS) terminal 110, 112, such as via Bluetooth® or mesh network connections.

The system 100 may also include a receipt printer 114 to which the wearable payment processing devices 102, 104, 106 may print transaction receipts. The transaction processing system 108 is also typically connected to a network 116, such as a secure, private financial transaction network, the Internet, or other network over which the transaction processing system 108 may exchange data with payment processing systems of one or more financial institutions 118, such as banks, credit card transaction processing entities, prepaid card administrators, and the like.

The system 100 is typically deployed within a retail environment. As is typical in retail environments, there may be one or more cash registers or fixed POS terminals 110, 112. The cash registers and fixed POS terminals 110, 112 may include self-service checkout kiosks and other similar type devices allowing customers to conduct transactions with little or no assistance from retail clerks. While cash registers and fixed POS terminals 110, 112 allow customers to perform transactions, customers are often looking for quicker ways to complete their transactions, to obtain quick assistance such as for product price checks, and to complete their transactions with the retail clerks with whom they are already working with. At the same time, retail outlets generally desire to smooth the checkout process and make it very easy for customers to purchase products. Wearable payment processing devices 102, 104, 106 address these desires, among others, in providing a very easy mode of conducting retail payment transactions rapidly and enable retail clerks to remain in their designated areas to obtain payment even when cash registers and fixed POS terminals are located in a different area of the retail outlet.

The transaction processing system 108 is a computing system through which cash registers and fixed POS terminals 110, 112 and wearable payment processing devices 102, 104, 106 connect to obtain product data and to process payment transactions. For example, a product barcode, also referred to as a Universal Product Code (UPC), or another one, two, or three dimensional barcode affixed to a product, may be scanned at a cash register or fixed POS terminal 110, 112 or by a wearable payment processing device 102, 104, 106. The respective device may then retrieve data representative of the product, such as a product description, a product price, and any applicable discounts, from the transaction processing system 108 that stores such data in database or accesses the data in a database accessible via a network. Once the cash register or fixed POS terminal 110, 112 or the wearable payment processing device 102, 104, 106 has scanned all products to be purchased and obtained the relevant product data from the transaction processing system 108, payment information is then obtained. The payment information may be obtained through a bankcard reading device (i.e., magnetic stripe reader, radio frequency identification (RFID) reader, credit card chip reader, etc.), scanning a barcode from a screen of a customer mobile device, imaging of a check, and the like. The cash register or fixed POS terminal 110, 112 or the wearable payment processing device 102, 104, 106 being used to conduct the transaction may then communicate payment data including at least a sum total of the transaction and at least a portion of the obtained payment data to the transaction processing system 108. The payment processing system 108 may then communicate over the network 116 with one or more financial institution 118 computing systems. An approval of the transaction may then be received by the transaction processing system 108 that is then forwarded on to the device on which the transaction was initiated. An option to print a receipt may then be provided on the respective cash register or fixed POS terminal 110, 112 or the wearable payment processing device 102, 104, 106. The receipt, if desired, may be printed on a printer local to the device, a network printer 114, or may be communicated electronically via a supplied or known customer email address or phone number.

The system 100 includes portions of the system 100 that are deployed within a retail outlet. The portions deployed within a store may include the one or more cash registers or fixed POS terminals 110, 112, the wearable payment processing devices 102, 104, 106, the transaction processing system 108, and the receipt printer 114, when present, in some embodiments. However, in other embodiments, a deployment may include only the wearable payment processing devices 102, 104, 106 and no cash registers or fixed POS terminals 110, 112. The transaction processing system 108 in such embodiments may be deployed as a network accessible resource, such as in a cloud computing architecture. Similarly, some embodiments may include the one or more cash registers or fixed POS terminals 110, 112 and the one or more wearable payment processing devices 102, 104, 106.

Figure 2:
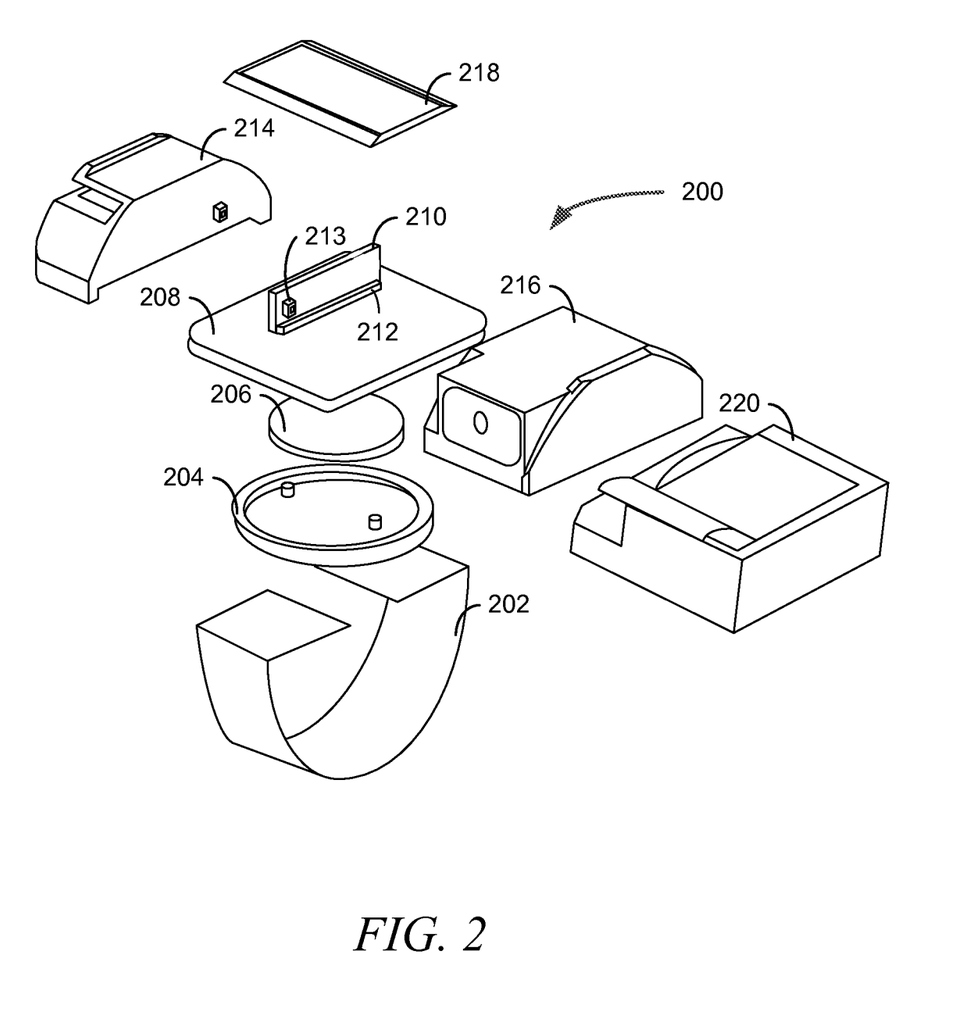
FIG. 2 is an assembly diagram of a wearable payment processing device, according to an example embodiment.

FIG. 2 is an assembly diagram of a wearable payment processing device 200, according to an example embodiment. The wearable payment processing device 200 is an example of the payment processing devices 102, 104, 106 of FIG. 1, according to some embodiments.

The wearable payment processing device 200 includes a strap 202, a fixed base 104 that mounts to the strap 202, a battery 206 that fits within the fixed base 204, and a mounting base 208 that connects to the fixed base 204 and receives electrical power from the battery 206. The mounting base 208 includes a socket 212 to receive a mainboard 210 where the socket 212 provides electrical power to the mainboard 210 as received from the batter 206 within the mounting base 208. The mainboard 210 includes one or more module connectors 213 that provide electrical power and data communication connections between the mainboard 210 and one or more modules connected directly thereto or indirectly through another module. The mounting base 208 is adapted to physically receive and secure one or more modules mounted thereon.

In some embodiments, the mounting base 208 is rotatable on its mount to the fixed base 204 or includes a rotatable structure. For example, the strap 202 may be an adjustable, bracelet-type strap adapted to allow for the wearable payment processing device 200 to be wrist-worn by a retail clerk. The retail clerk may choose to place the wearable payment processing device 200 on either a left or a right wrist. However, the retail clerk may prefer the modules mounted thereto to be oriented in a manner that eases use of the wearable payment processing device 200 or to allow a customer to manipulate the device, such as to swipe a bankcard or to provide a signature. Thus, by allowing the mounting base 208 to rotate, retail clerk and customer manipulation may be simplified and comfortable wear may be enhanced.

The one or more modules that may be mounted to the mounting base 208 and connected directly or indirectly to the mainboard 210 via the one or more module connectors 213 include a bankcard reader 214, an imaging device 216, a display device 218, and a printer 220. In some embodiments, each of the bankcard reader 214, imaging device 216, display device 218, and printer 220 are physically adapted to connect to the mounting base 208 which secures these modules in place, although they may be detached for service, replacement, and reconfiguration. Additionally, although the illustrated embodiment of the wearable payment processing device 200 includes the bankcard reader 214, imaging device 216, display device 218, and printer 220, other embodiments may include fewer of these module, such as the wearable payment processing devices 102, 104, 106 of FIG. 1 that are illustrated without a printer 220. Further, although the wearable payment processing device 200 is illustrated and described as being modular in nature, meaning the various modules may be selectively assembled and physically configured, other embodiments may include an integrated assembly that is not reconfigurable.

The mainboard 210 generally adapted to mount to the socket 212 of the mounting base 208 to receive electrical power from battery 206. The mainboard 210 in an integrated circuit board and includes, or has mounted thereto, at least one processor, a network interface device (i.e., a wireless network device allowing communication via Wi-Fi® networks, a Bluetooth® transceiver, a mesh network transceiver, etc.) at least one memory device, and software stored on the memory device that is executable by the at least one processor to operate the wearable payment processing device 200. This software includes instructions executable by the at least one processor to communicate with each of the modules that may be mounted to the wearable payment processing device 200. The software includes further instructions to facilitate configuration of the wearable payment processing device 200 either directly through the display device when including touch input functionality, when physically connected to another computing device such as a personal computer or a mobile device, or wirelessly by a remote administrator. The software also includes instructions to operate the wireless payment processing device 200 to perform payment transactions, such as is further described below.

The bankcard reader 214 is a device capable of reading data from a bankcard, such as a credit card, a prepaid card, an automated teller machine card (ATM), store loyalty card, and the like. In some embodiments, the bankcard reader 214 may include a magnetic stripe reader (MSR) such as are available from Nidec Sankyo Corporation of Tokyo, Japan. The bankcard reader may also, or alternatively, include a chip reader, such as one or both of an RFID reader and a smart chip reader, to read data from chips embedded in bankcards. The bankcard reader 214 connects to the mainboard 210 via a module connector corresponding to the module connector 213 of the mainboard 210 or of one or more other module devices through which the bankcard reader 214 is mounted. Bankcard data is provided by the bankcard reader 214 to the mainboard when read.

The imaging device 216 is a device capable of scanning products to obtain product identification data, such as a barcode reader including one or more of dedicated circuitry, firmware, or software to read a scanned barcode to obtain the product identification data. An example of such a barcode reader is the Intermec® EA11 Standard-Range 2D Imager available from the Scanning and Mobility division of Honeywell International Inc. of Mount Laurel, N.J. In other embodiments, the imaging device 216 may be another camera-type device that includes software to identify and read one or more one, two, and three dimensional barcodes or to provide captured images to the mainboard 210 that may include the software thereon to identify and read barcodes. The imaging device 216 connects to the mainboard 210 via a module connector corresponding to the module connector 213 of the mainboard 210 or of one or more other module devices through which the imaging device 216 is mounted. One or both of product identification data and images are provided by the imaging device 216 to the mainboard when captured.

The display device 218 is a device capable of presenting a view of data, as received from the mainboard 218. Such data may include product data and prices as retrieved by software executing on a processor of the mainboard 210 from a transaction processing system or other data source. The data presented may also include a sum total of a purchase transaction, bankcard data as read by the bankcard reader 214, prepaid card balance information as retrieved from a transaction processing system or other system based on a read bankcard, and the like. In some embodiments, the display device 218 may also include touch input functionality. An example of such as display device is the EM027AS012 e-paper (i.e., electronic paper) display module available from Pervasive Displays, Inc. of Tainan City, Taiwan, as may be augmented with touch screen capabilities. Another example of such a display device is model number TTW4028001 touch screen display device available from MicroController Pros, LLC of Carson City, Nev.

The display device 218 may connect to the mainboard 210 via a module connector corresponding to the module connector 213 of the mainboard 210 or of one or more other module devices through which the display device 218 is mounted. In some embodiments, the bankcard reader 214 and imaging device 216, when mounted to the mounting base 208, fit together to provide a physical mounting area within which the display device 218 securely mounts and receives data connectivity with the mainboard via electrical connections provided by one or both of the bankcard reader 214 and the imaging device 216. Data to be presented, and data received as input in embodiments where the display device 218 includes touch input functionality, are communicated between the display device 218 and the mainboard 210 via these electrical connections.

The printer 220 is a device capable of outputting transaction receipts based on data received from the mainboard 210. The printer may be a thermal or ink printer and includes a paper roll and a corresponding paper feeding motor. The printer 220 connects to the mainboard 210 via a module connector corresponding to the module connector 213 of the mainboard 210 or of one or more other module devices through which the printer 220 is mounted. Receipt data is communicated to the printer 220 by the mainboard 210 when a receipt is to be printed. In some embodiments, a retail clerk may have one wearable payment processing device 200 that includes all the elements of the wearable payment processing device 200 of FIG. 2 including all the illustrated modules (i.e., the bankcard reader 214, imaging device 216, and display device 218) except the printer 220. An example of a wearable payment processing device 200 is illustrated and described with regard to FIG. 3. In some such embodiments, the retail clerk may also have another wearable payment processing device 200 that includes only the printer 200 and none of the other illustrated modules (i.e., the bankcard reader 214, imaging device 216, and display device 218). In such embodiments, the retail clerk may cause transaction receipts to be printed from the printer of the another wearable payment processing device 200.

Figure 3:
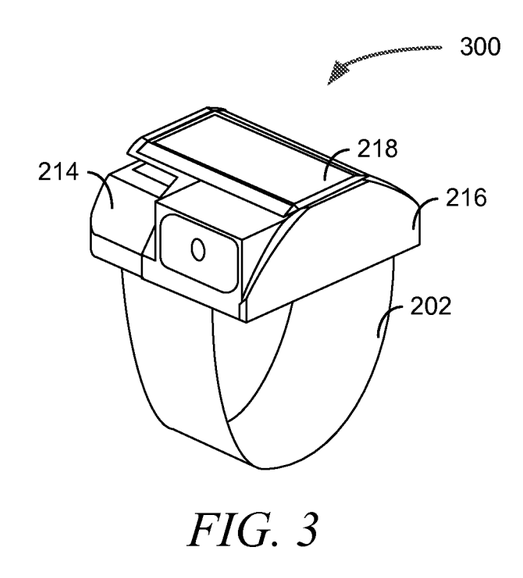
FIG. 3 is a wearable payment processing device, according to an example embodiment.

FIG. 3 is a wearable payment processing device 300, according to an example embodiment. The wearable payment processing device 300 is an example of a modular configuration of the wearable payment processing device 200 of FIG. 2, but without the printer 220. The wearable payment processing device 300 includes the strap 202, the bankcard reader 214, the imaging device 216, and the display device 218. In various embodiments, the strap 202 may be an adjustable bracelet-type strap to allow for the wearable payment processing device 300 to be wrist, forearm, bicep, or waist-worn by a retail clerk or other retail outlet employee. Although some embodiments include the strap 202, other embodiments include other wearable items to which the wearable payment processing device 300 may be attached. For example, the wearable payment processing device 300, may include, rather than the strap 202, a lanyard, a waist-worn belt, or an article of clothing to which the fixed base 204 of FIG. 2 is attached and to which the mounting base 208 and the wearable payment processing device 300 may be mounted.

Figure 4:
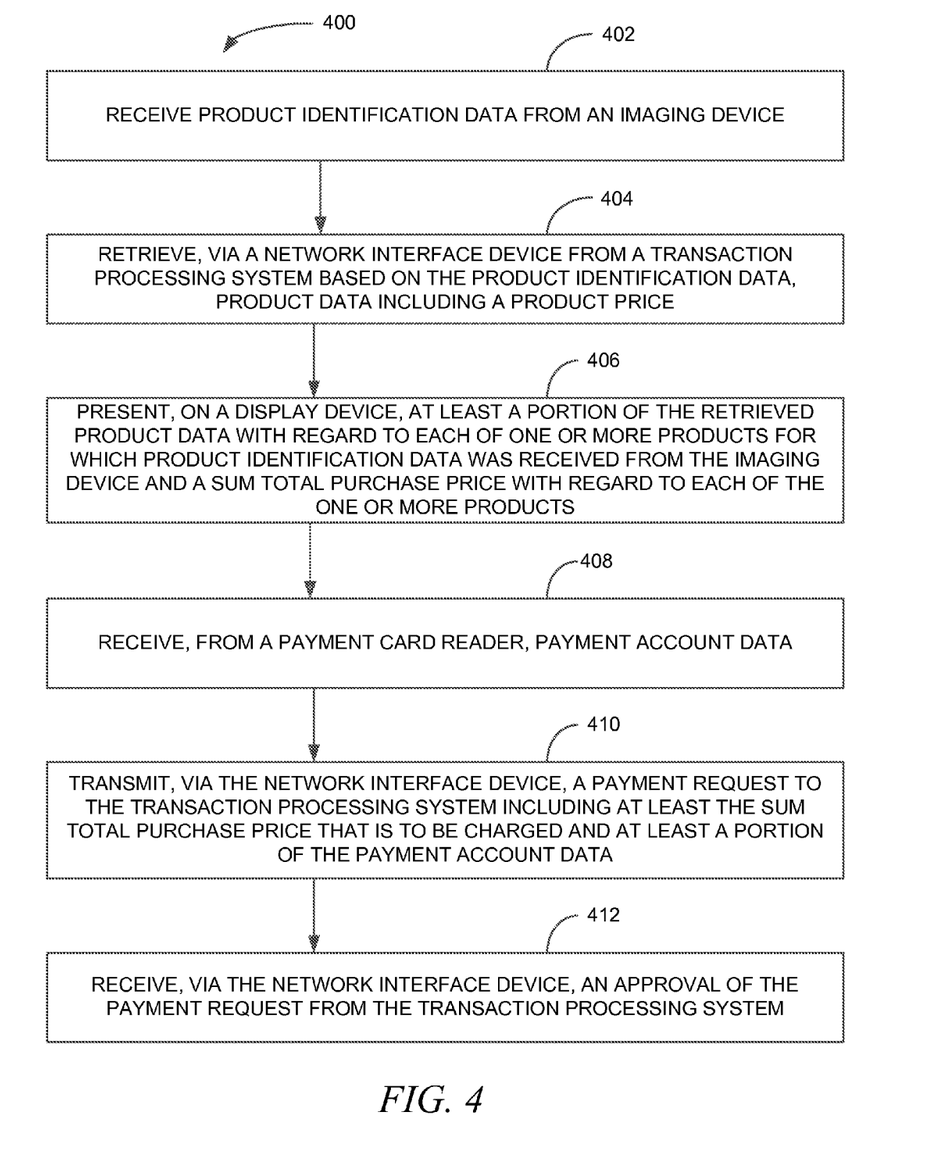
FIG. 4 is a block flow diagram of a method, according to an example embodiment.

FIG. 4 is a block flow diagram of a method 400, according to an example embodiment. The method 400 is an example of a method that may be performed in whole or in part by a wearable payment processing device. For example, the method 400, and various embodiments described with reference thereto, may be performed in whole or in part on a mainboard of a wearable payment processing device through execution of instructions stored in at least one memory device on at least one processor of the mainboard.

The method 400 includes receiving 402 product identification data from an imaging device of a human-wearable payment processing device. The method 400 then retrieves 404 product data including a product price via a network interface device of the human-wearable payment processing device from a transaction processing system based on the product identification data, product data including a product price. The method 400 may then present 406, on a display device, at least a portion of the retrieved product data with regard to each of one or more products for which product identification data was received from the imaging device. The presented 406 data, in addition to other data that may be presented, may include one or more of data with regard to each of the products, a price of each product, and a sum total purchase price with regard to each of the one or more products. In some embodiments or specific transaction, the method 400 further receives 408, from a payment card reader of the human-wearable payment processing device, payment account data, such as data read from a credit card, ATM card, prepaid card, check, a mobile device display, and the like. The method 400 may then transmit 410, via the network interface device, a payment request to the transaction processing system including at least the sum total purchase price that is to be charged and at least a portion of the payment account data. In response to the payment request, the method 400 receives 412, via the network interface device, a payment approval from the transaction processing system.

In some embodiments of the method 400 receiving 402 product identification data from the imaging device includes processing an image received from the imaging device to locate a bar code and decoding the bar code to obtain the product identification data.

Further embodiments of the method 400 include generating receipt document data including data representative of at least a portion of the retrieved product data, at least a portion of the payment account data, and the sum total purchase price. The receipt document data may then be output for presentation to the customer according to a default setting, a customer preference as indicated in data received from the transaction processing system, as requested by the customer, or as specified by the retail clerk. For example, the receipt document data may be simply output to a printer device, which may be coupled to or integrated within a wearable payment processing device or accessible via a data network. The receipt document data may also or alternatively be provided in an electronic message to the customer via email or text message (i.e., short message service (SMS), multimedia messaging service (MMS), and other similar services).

In some embodiments of the method 400, the display device on which data is presented includes touch-input functionality through which user input may be received. Some such embodiments include presenting, on the display device, an interface within which to receive signature input. Some embodiments may further include an option to receive additional input from a customer, retail clerk, manager, or other user, to allow for addition of a tip amount, a price change override or authorization, and other such input.

Figure 5:
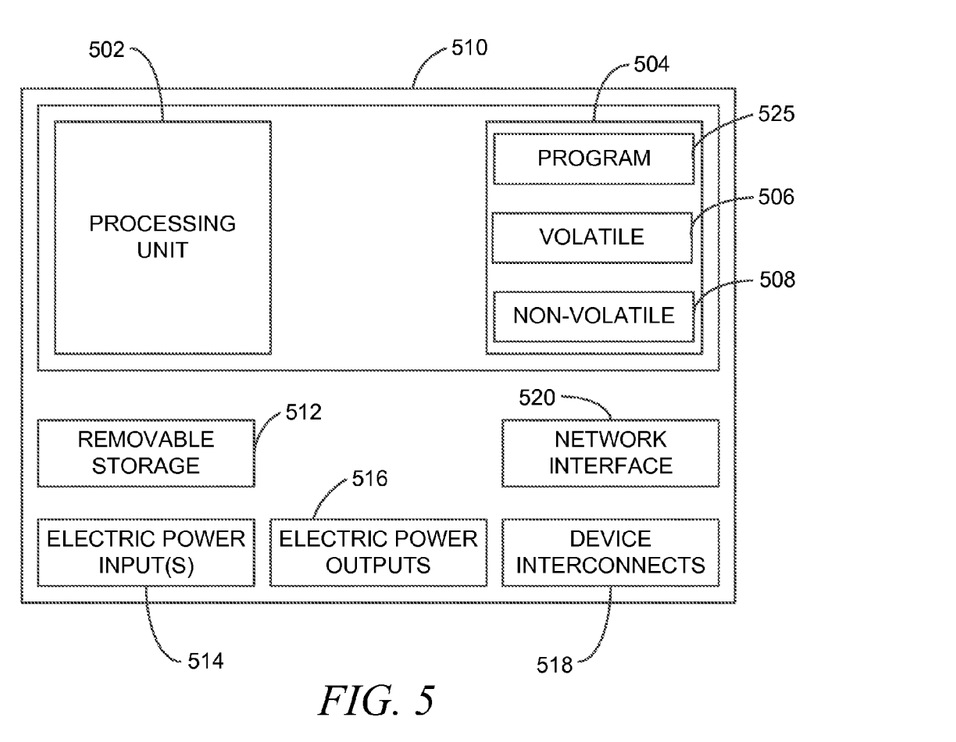
FIG. 5 is a logical block diagram of a mainboard of a wearable payment processing device, according to an example embodiment.

FIG. 5 is a logical block diagram of a mainboard 510 of a wearable payment processing device, according to an example embodiment.

The mainboard 510 includes at least one processing unit 502, memory 504, and non-removable storage 514. In some embodiments, the mainboard 510 may also include removable storage 512, such as a removable flash memory card. Although the various data storage elements are illustrated as part of the mainboard 510, the storage may also include network accessible or cloud-based storage.

The memory 504 may include volatile memory 506 and non-volatile memory 508. Mainboard 510 may include—or have access to a computing environment that includes a variety of computer-readable media, such as volatile memory 506 and non-volatile memory 508, and removable storage 512. The memory 504 may include random access memory (RAM), read only memory (ROM), erasable programmable read-only memory (EPROM) & electrically erasable programmable read-only memory (EEPROM), flash memory or other memory technologies, and other mediums capable of storing computer-readable instructions. Mainboard 510 includes an electrical power input 514 and output 516, and device interconnects 518. Mainboard 510 also includes at least one network interface device 520. The network interface device 520 may include one or more of a wireless network device, such as a Wi-Fi® transceiver, a Bluetooth® transceiver, a mesh network transceiver, and the like. The input 516 may include one or more input connectors to receive input from one or more of a touchscreen, touchpad, imaging device, a bankcard reader, an RFID reader, and other input devices.

Instructions stored on a computer-readable medium are executable by the processing unit 502 of the mainboard 510. A memory 504 and removable storage 512 are some examples of a non-transitory computer-readable medium. For example, various computer programs 525 or apps, such as one or more applications and software modules implementing one or more of the methods illustrated and described herein, may be stored on a non-transitory computer-readable medium.

Another embodiment includes a mounting base having first and second opposing sides. The first opposing side is adapted to attach to a fixed base and the second opposing side adapted to attach to a payment processing device. The payment processing device in this embodiment is adapted to attach to the second opposing side of the mounting base. The payment processing device includes a payment card reader, an imaging device, and a display device electrically interconnected by a mainboard. The mainboard of such embodiments includes at least one processor, at least one memory device, and a network interface device. The at least one memory device stores instructions executable by the at least one processor to perform product purchase transactions for products identified via the imaging device and with payment data received via the payment card reader.

In some such embodiments, the fixed base includes a battery compartment integrated therein to hold a battery to provide electricity to power the payment processing device. Further, the mainboard attaches directly to the mounting base via electrical interconnects that are connected to the battery connections within the battery compartment and includes electrical connections to connect to the payment card reader, the imaging device, and the display device. In some such embodiments, the payment card reader, the imaging device, and the display device are individual modular devices connectable to the mounting base and the mainboard.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A device comprising:
a mounting base having first and second opposing sides, the first opposing side adapted to attach to a fixed base and the second opposing side adapted to attach to a payment processing device;
the payment processing device adapted to attach to the second opposing side of the mounting base and including a payment card reader, an imaging device, and a display device electrically interconnected by a mainboard including at least one processor, at least one memory device, and a network interface device, the at least one memory device storing instructions executable by the at least one processor to perform product purchase transactions for products identified via the imaging device and with payment data received via the payment card reader, and wherein the device is adapted to be worn on a wrist and the mounting base is adapted to be adjustably rotated to an orientation selected by a wearer of the device, and wherein the payment processing device adapted to transmit receipt data for the product purchase transactions to a second of said device adapted to be worn on another wrist and the second of said device adapted to print the receipt data.

2. The device of claim 1, wherein:
the fixed base includes a battery compartment integrated therein to hold a battery to provide electricity to power the payment processing device;
the mainboard attaches directly to the mounting base via electrical interconnects that are connected to the battery connections within the battery compartment and includes electrical connections to connect to the payment card reader, the imaging device, and the display device; and
the payment card reader, the imaging device, and the display device are individual modular devices connectable to the mounting base and the mainboard.

3. The device of claim 1, wherein the instructions stored by the at least one memory device executable by the at least one processor to perform product purchase transactions for products identified via the imaging device and with payment data received via the payment card reader are executable by the at least one processor to:
receive product identification data from the imaging device;
retrieve, via the network interface device from a transaction processing system based on the product identification data, product data including a product price;
present, on the display device, at least a portion of the retrieved product data with regard to each of one or more products for which product identification data was received from the imaging device and a sum total purchase price with regard to each of the one or more products;
receive, from the payment card reader, payment account data;
transmitting, via the network interface device, a payment request to the transaction processing system including at least the sum total purchase price that is to be charged and at least a portion of the payment account data; and
receive, via the network interface device, an approval of the payment request from the transaction processing system.

4. The device of claim 3, wherein receiving product identification data from the imaging device includes:
processing an image received from the imaging device to locate a bar code; and
decoding the bar code to obtain the product identification data.

5. The device of claim 3, wherein:
the instructions stored by the at least one memory device are further executable by the at least one processor to output a receipt.

6. The device of claim 1, wherein the imaging device is a barcode reader.

7. The device of claim 1, wherein the payment card reader is a magnetic stripe reader.

8. The device of claim 1, wherein the display device is an electronic paper display device.

9. The device of claim 8, wherein:
the display device includes touch-input functionality; and
the instructions stored by the at least one memory device are further executable by the at least one processor to:
present on the electronic paper display device an interface within which to receive a signature input; and
capture, via the touch-input functionality of the display device, signature input.

10. A method comprising:
receiving product identification data from an imaging device of a human-wearable payment processing device, wherein the human-wearable payment processing device includes a mounting base adapted for rotation to an orientation desired by a wearer of the human-wearable payment device;
retrieving, via a network interface device of the human-wearable payment processing device from a transaction processing system based on the product identification data, product data including a product price;
presenting, on a display device of the human-wearable payment processing device, at least a portion of the retrieved product data with regard to each of one or more products for which product identification data was received from the imaging device and a sum total purchase price with regard to each of the one or more products;
receiving, from a payment card reader of the human-wearable payment processing device, payment account data;
transmitting, via the network interface device, a payment request to the transaction processing system including at least the sum total purchase price that is to be charged and at least a portion of the payment account data;

receiving, via the network interface device, an approval of the payment request from the transaction processing system;

transmitting, via the network interface device, receipt data for the transaction to a second of said human-wearable processing device that is wrist-wearable and printing by the second of said human-wearable processing device the receipt data for the transaction.

11. The method of claim 10, wherein receiving product identification data from the imaging device includes:

processing an image received from the imaging device to locate a bar code; and decoding the bar code to obtain the product identification data.

12. The method of claim 10, wherein the display device includes touch-input functionality through which user input is received.

13. The method of claim 12, further comprising:

presenting, on the display device, an interface within which to receive signature input receive, via the touch-input functionality of the display device, signature input.

14. The method of claim 10, wherein the human-wearable payment processing device is wrist-wearable.

15. The method of claim 10, further comprising:

receiving electrical power from a battery housed within a fixed base of the human-wearable payment processing device by a mainboard of the human-wearable payment processing device; and providing electrical power, by the mainboard, to other devices of the human-wearable payment processing device including the imaging device, display device, payment card reader.

16. The method of claim 15, wherein the network interface device is integrated within the mainboard.

17. The method of claim 15, wherein mainboard includes at least one processor and at least one memory device, the memory device storing instructions executable by the at least one processor to cause the human-wearable payment processing device to perform the method.

\* \* \* \* \*